Feb. 8, 1938.   R. E. WALL   2,107,682
UNLOADING TRUCK
Filed July 21, 1937   3 Sheets-Sheet 1
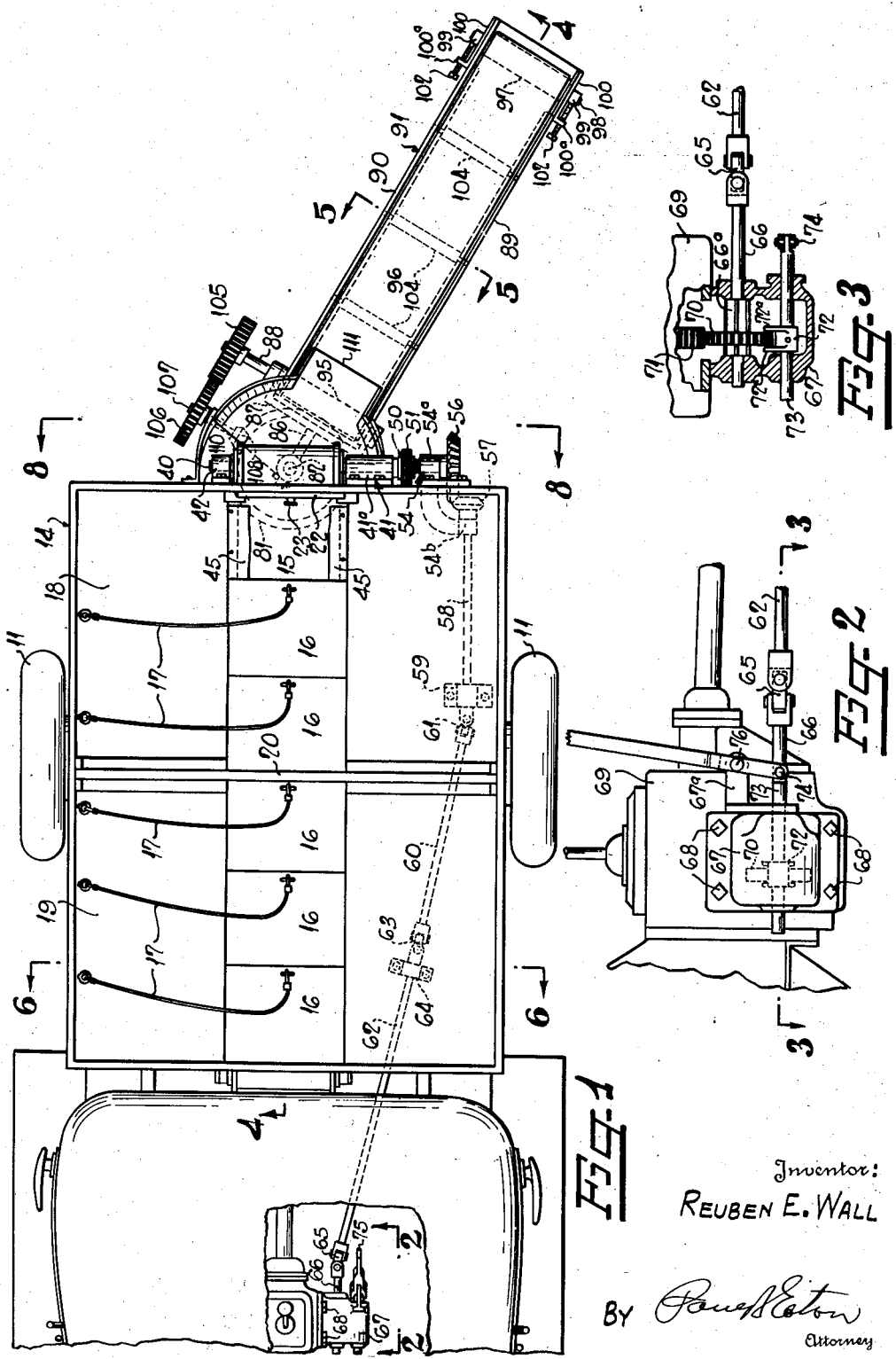
Inventor:
REUBEN E. WALL
By Paul S Eaton
Attorney Feb. 8, 1938.                R. E. WALL                2,107,682
                          UNLOADING TRUCK
                        Filed July 21, 1937           3 Sheets-Sheet 2
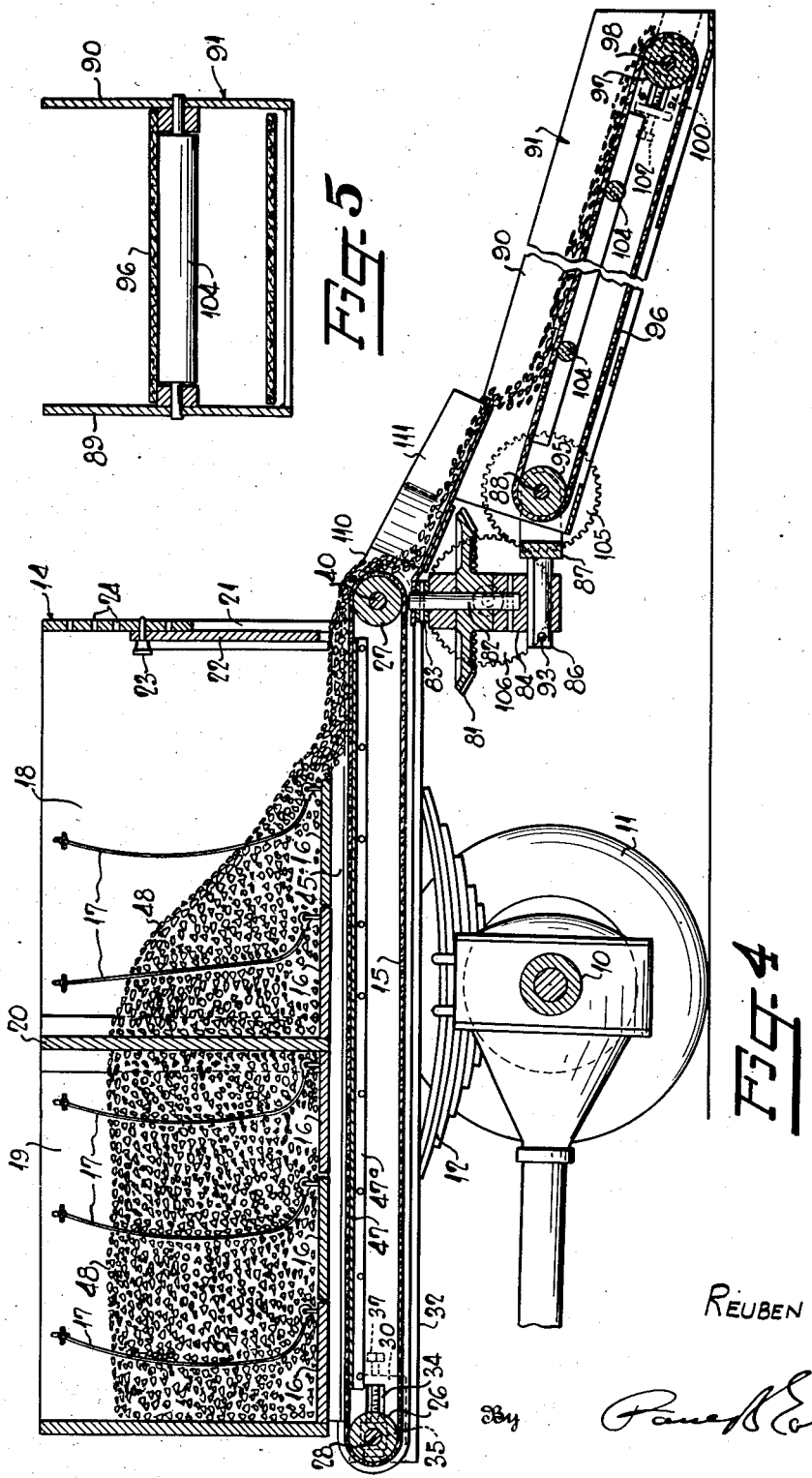
Inventor:
REUBEN E. WALL
By
Attorney

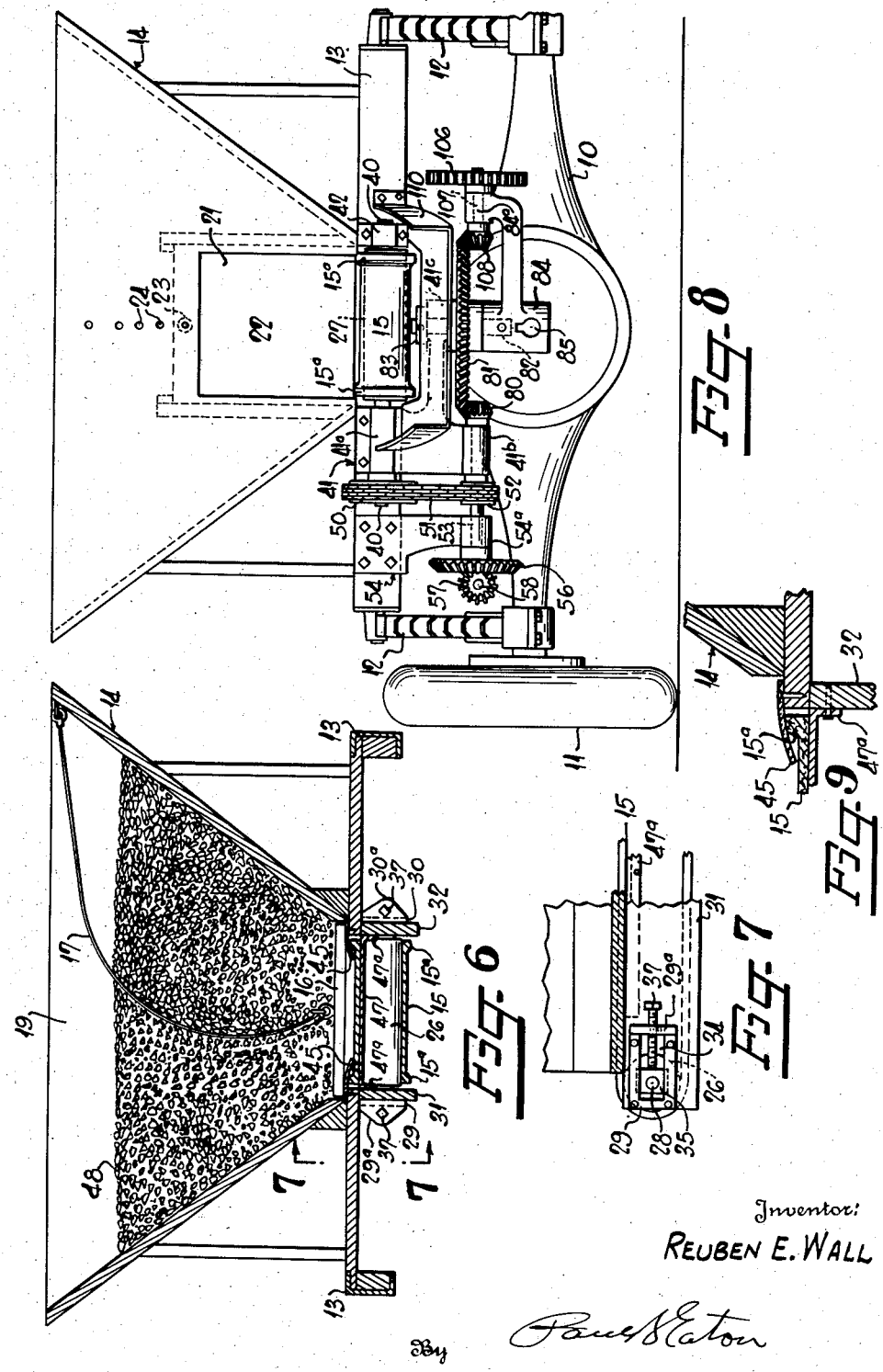

Patented Feb. 8, 1938

2,107,682

UNITED STATES PATENT OFFICE 2,107,682

UNLOADING TRUCK

Reuben E. Wall, Winston-Salem, N. C.

Application July 21, 1937, Serial No. 154,840

2 Claims. (Cl. 214—83)

This invention relates to an apparatus which is preferably used in combination with a motor truck for transporting quantities of material and unloading the same under the power of the motor vehicle. It is very often necessary for a dealer in materials such as coal, crushed stone and the like to distribute a single load to several different customers. It therefore, makes it necessary to measure each customer's amount and keep them separated during transportation. Due to the necessity of keeping each customer's materials in a separate batch; it is impracticable to unload by tilting the bed of the truck because the entire amount would be unloaded; consequently, means must be provided whereby one portion of the load may be unloaded at a time without disturbing the other portion or portions.

It is therefore, an object of this invention to provide an unloading device for use in combination with a motor driven vehicle comprising, a truck bed with a conveyor mounted in the lower portion thereof, said truck bed having a plurality of partitions therein which are disposed transversely of said conveyor whereby the material disposed in the separate compartments may be unloaded, one compartment at a time, without disturbing the material in the other compartments.

It is a further object of this invention to provide an unloading device of the class described, with means disposed in the bottom of said truck bed and directly over said conveyor for regulating the amount of material which is allowed to fall upon said conveyor during the unloading operation. This is a very important feature, because heretofore, in trucks where the material rested upon the entire length of the conveyor there was a tendency for more material to settle on the conveyor belt than was possible for the conveyor to handle; consequently, the conveyor belt would be stalled due to the friction provided by the heavy load of material placed thereon. By providing suitable covers disposed directly over the conveyor belt with a suitable wire or cord secured thereto, the operator may remove one of the boards at a time to allow the desired portion of the belt to be exposed to the falling material within the truck bed.

It is a further object of this invention to provide an unloading device in combination with a truck comprising, a truck bed with a plurality of compartments therein, a conveyor extending the entire length of said truck bed and beneath each compartment, a second conveyor pivotally secured to the trailing edge of said truck and positioned so as to receive the material at the delivery end of said first conveyor, said second conveyor being mounted for universal movement relative to the truck so that its delivery end may be placed at an angle relative to the longitudinal and transverse axes of the truck. This will allow the driver to position the truck and the delivery end of the conveyor so as to accommodate almost any unloading conditions.

Some of the objects of the invention having been stated, other objects will appear as the description proceeds when taken in connection with the accompanying drawings, in which:—

Figure 1 is a plan view of a portion of a truck showing my invention applied thereto;

Figure 2 is an elevation taken along line 2—2 in Figure 1 showing a portion of a motor truck transmission with a power take-off unit secured thereto;

Figure 3 is a sectional, plan view taken along line 3—3 in Figure 2;

Figure 4 is a longitudinal, sectional view taken along line 4—4 in Figure 1 showing material being unloaded by my improved apparatus;

Figure 5 is a transverse, sectional view taken along line 5—5 in Figure 1;

Figure 6 is a transverse, sectional view taken along line 6—6 in Figure 1, with material added;

Figure 7 is a sectional view taken along line 7—7 in Figure 6 showing means for adjusting the tension upon the conveyor belt which is disposed beneath the truck hopper;

Figure 8 is a rear elevation of the truck with the delivering conveyor removed therefrom and taken along line 8—8 in Figure 1;

Figure 9 is an enlarged, sectional, detail view of the lower central portion of Figure 6.

Referring more specifically to the drawings, the numeral 10 denotes the rear axle housing of an automobile truck which is supported by rear wheels 11. Secured to the housing 10 and near the wheels 11 are suitable springs 12 which support the framework 13 of the truck. Upon this framework a suitable hopper 14 is mounted which has inclined sides so that the material therein will tend to flow toward the conveyor belt 15 which is disposed beneath the bottom portion of the hopper. It will be noted, however, that this belt is normally protected from the material which may be disposed within the hopper 14, by means of suitable cover boards 16 which serve as a removable bottom and are adapted to be removed when it is desired to allow the material to settle down upon the conveyor belt during an unloading operation.

Each of the boards 16 has a suitable wire or cord 17 secured thereto, the upper end of said wire or cord being secured to the inside upper portion of the hopper 14 where the operator will have access thereto when it is desired to remove one of the boards. The hopper 14 has a plurality of compartments such as 18 and 19, said compartments being separated by a removable partition 20. While only two compartments are shown, in the drawings, it is quite evident that as many compartments may be provided as desired. The purpose of the compartments, of course, is to allow a measured quantity of material to be placed in each compartment for distribution to different customers or at different places, without disturbing the quantities within the other compartments.

At the rear end of the hopper 14, a suitable opening 21 is provided which is normally adapted to be closed by a vertically disposed sliding gate 22. This gate may be raised at any desired height during an unloading operation so as to vary the size of the opening 21 through which the material is allowed to be withdrawn by the conveyor belt 15 during an unloading operation. The gate 22 is held in the desired position by a suitable pin 23 which penetrates any one of the spaced holes 24 which are bored in the rear wall of hopper 14.

By referring to Figures 4 and 6, it will be seen that the conveyor belt 15 is mounted upon suitable rollers 26 and 27, the roller 26 being rotatably mounted near the forward end of the hopper 14 on shaft 28, and between suitable adjustable bearings 29 and 30 (Figures 4, 6, and 7). These bearings are secured to downwardly projecting side boards 31 and 32 which depend from the lower portion of the hopper 14. Each of the bearings 29 and 30 have a suitable slot 34 therein in which is slidably mounted a block 35. These blocks are adapted to receive the ends of shaft 28 upon which roller 26 is mounted.

Threadably secured in the outstanding legs 29a and 30a, respectively, are adjusting screws 37 which have their ends normally engaging the blocks 35 to maintain the proper tension upon the upper and lower layers of belt 15.

The roller 27 is fixedly mounted around shaft 40, which shaft is rotatably mounted in bearings 41a and 42, secured to the rear end of the framework 13. The bearing 41a is cast in bracket 41.

It will be noted that the belt 15 has suitable ribs 15a projecting from its outer side and along the edge thereof. These ribs are adapted to pass directly beneath suitable flexible flaps 45 which extend over the upper layer of the belt, and which have one edge thereof secured to the lower portion of the hopper 14, (Figs. 4, 6, and 9). These flaps 45 cooperate with the ribs 15a to prevent material from getting between the layers of the belt and damaging the same as it passes over the rollers or escaping during handling. Since the flaps 45 are made of any suitable flexible material such as heavy canvas, leather or the like, there is a tendency during usage for the free ends of the flaps which project over the ribs 15a, to conform to the shape of the rib since the material is continuously falling upon the upper side thereof; consequently, there is very little chance of material passing between the layers of the belt during an unloading operation.

It will also be noted by referring to Figures 4 and 6, that the upper layer of the belt is supported by a suitable plate 47 which has downturned flanges 47a, said flanges being secured to the members 31 and 32. During an unloading operation the roller 27 is caused to rotate in a clockwise manner in Figure 4, which, in turn, will cause the belt 15 to likewise rotate and remove the material which has been or is allowed to fall upon the upper portion thereof.

Usually, the gate 22 is opened the desired amount in order to provide the proper outlet for the material, after which one or more of the boards 16 are removed from the bottom of the compartment. Of course, it is necessary to first remove the board at the extreme right-hand portion of compartment 18, so that a limited amount of material 48 will be allowed to fall downwardly upon the top of the belt 15. As the material is unloaded from the compartment 18 other boards 16 are removed until the entire amount in the compartment is exhausted therefrom. Then if it is desired to move to another location, and deposit the contents of compartment 19, the same operation will take place after raising the partition 20.

It is seen that by providing the false bottom comprising the boards 16, only a limited amount of material is allowed to fall upon the belt during the unloading operation; consequently, the amount of power which is necessary to rotate the belt will not be excessive at any time. If the entire top area of the belt were covered with material it would be necessary to unload material from all of the bottom portion of the compartment at the same time, which of course, would create a tremendous friction upon the belt and impose strain and wear upon the working parts of the unloading device. For this reason, many of the conventional unloading devices have proven impracticable.

The shaft 40, upon which the roller 27 is fixedly secured, has a portion thereof projecting beyond the bearing 41a and on this portion of the shaft, a suitable gear 50 is mounted. A suitable chain 51 is mounted upon this gear, which chain is also mounted upon another gear 52 on shaft 53, said shaft 53 being rotatably mounted in bearings 54a of bracket 54 and bearing 41b of bracket 41. The bearing 41b is a portion of the bracket 41 which has been previously described. The shaft 53 also has fixedly secured thereon a suitable beveled gear 56 which meshes with another beveled gear 57. This gear 57 is fixedly secured on shaft 58, which, in turn, is rotatably mounted in bearings 54b and 59. The left-hand end of shaft 58 (Fig. 1), is connected to another shaft 60 by a suitable universal joint 61 and the shaft 60 is, in turn, connected to shaft 62 by a universal connection 63, which is similar in all respects to connection 61. The shaft 62 has its right-hand end supported by the truck chassis.

Shaft 62 is connected to the power take-off shaft 66 by another universal connection 65, said shaft 66 being rotatably mounted in housing 67 of the power take-off unit, (Figs. 1, 2 and 3). This housing is secured by any suitable means such as bolts 68 to conventional transmission housing 69 of a motor vehicle. The shaft 66 has an enlarged portion 66a upon which is slidably keyed a suitable gear 70. This gear 70 is normally in engagement with constantly rotating gear 71 of the transmission when the power take-off unit is delivering power to the conveyor. However, when the conveyor belts are not in operation, the gear 70 is moved out of engagement with gear 71. The means for moving the gear 70 back and forth, in and out of engagement with the gear 71, is effected by means of a suitable forked yoke 72 which has suitable prongs 72a extending upon opposed sides of the gear 70. The yoke is fixedly secured upon a shaft 73, which, in turn, is slidably mounted in housing 67.

Pivotally secured to the right-hand end of shaft 73, as at 74, is an upwardly extending shaft lever 75. This lever is pivoted intermediate its ends as at 76 to projection 67a which extends laterally from the housing 67. When it is desired to move the gear 70 out of engagement with the gear 71, it is only necessary to rotate the lever 75 in a counter-clockwise manner, in Figure 8, thereby causing the shaft 73 and its associated yoke 72 to move the gear 70 to the right upon the portion 66a, and thereby cause it to become disengaged from the gear 71.

By referring to Figure 8, it will be noted that shaft 53 also has a beveled gear 80 secured on the right-hand end thereof which is adapted to mesh with a larger beveled gear 81, said gear 81 being rotatably mounted around a shaft 82. The shaft 82 is likewise rotatably mounted in bearing 41c of bracket 41 and is secured therein by means of a suitable collar 83 disposed on the upper end of said shaft. The lower end of shaft 82 has fixedly secured thereto a bracket 84 which has a hole 85 in the lower end thereof into which a suitable pin 86 is adapted to fit. This pin has secured to the right-hand portion thereof (Figs. 1 and 4), a forked yoke 87 which supports the ends of a roller shaft 88 and the side members 89 and 90 of the delivery conveyor 91. If desired, a suitable pin 93 may be inserted in the end of the member 86 (Fig. 4), to normally hold the yoke and its associated parts in a fixed position, however, in actual practice, this is not generally necessary because the lower end of conveyor 91 normally rests upon some stationary object, or upon the material which is being unloaded which will normally tend to hold the pin 93 in position.

The shaft 88 has a suitable roller 95 fixedly secured therearound and upon this roller is mounted a conveyor belt 96 which is also mounted around a second roller 97, said roller 97 being fixedly secured around shaft 98. The shaft 98 has its ends mounted in blocks 99, which blocks are slidably mounted in take-up bearings 100. The bearings 100 are secured on opposed sides of the conveyor 91 and threadably secured in the outstanding lugs 100a of each of said bearings, is a threaded bolt 102, whose end is normally adapted to engage the block 99. This arrangement is very similar to the take-up bearing 29 which has been previously described, (Figs. 6 and 7).

Rotatably mounted between the side boards 89 and 90 is also a plurality of rollers 104 which are used to support the intermediate portions of top layer of belt 96, the power necessary to drive this delivery belt is obtained through gear 105 which is fixedly secured on shaft 88. This gear meshes with gear 106 on shaft 107, said shaft being rotatably mounted in bearing 84a of bracket 84. The other end of shaft 107 has a beveled gear 108 fixedly secured thereon which normally meshes with the beveled gear 81.

It is seen that the bracket 84 is so constructed that it may be turned at various angles relative to the longitudinal center line of the truck, thereby making it possible to place the delivery end in many different positions for unloading the material within the truck. Also, since the left-hand end of the conveyor 91 is pivotally mounted around the shaft 88, and connected to the yoke member 87, the delivery end of the conveyor may be moved up or down to place or deliver the material at different elevations.

In order that the material may be properly transferred from the first conveyor to the second conveyor, a suitable apron 110 has been secured to the trailing end of the truck and beneath the delivery end of the first conveyor belt 15. In this apron 110 a chute 111 is rotatably mounted which has its delivery end disposed over the second conveyor belt 96. This chute is so constructed that it may be turned at the same angle that the conveyor 91 is turned so that its delivery end will be disposed directly over the delivery conveyor 91.

When the truck is in transit the delivery conveyor 91 is removed. This may be easily accomplished by removing the pin 93 so that member 86 can be withdrawn from bracket 84.

It is therefore, seen that I have provided an unloading device for materials in which the amount of material delivered from the hopper to the conveyor may be controlled by the operator. This will prevent an excessive load from being imposed upon the belt at any time, and also insure that the amount expelled will remain practically constant. Also, by so controlling the outflow of the material, it is possible to separate the truck bed into different separate compartments and deliver the amount in these compartments to separate customers or at separate points without disturbing the material in the other compartments.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. In combination, a truck having a bed thereon, partition means removably secured in the bed and forming a plurality of compartments therein, the sides of the bed converging towards each other at their lower edges, a trough disposed below said bed and extending the entire length of the bed, a plurality of removable bottom members disposed above said trough, an endless conveyor disposed in said trough, means extending from each of said bottom members to the upper part of the bed for removing the bottom members while material is resting thereon and so that the material may fall onto said conveyor, a second endless conveyor pivotally secured to the rear end of the truck and below the delivery end of the first conveyor to receive the contents of the compartments discharged by the first conveyor, said second conveyor being mounted for lateral and vertical swinging movement to thereby deliver the material to the desired point relative to the rear end of the truck, and a driving connection between the motor of the truck and said conveyors.

2. An unloading transporting apparatus for bulk materials comprising a hopper-shaped bed member, an endless conveyor disposed below the discharge portion of the bed member, a plurality of members removably disposed above said conveyor and forming a bottom for said bed member, a vertically disposed shaft disposed at the rear end of said bed member, a gear mounted for rotation on said shaft, power driven means for driving said gear and said conveyor, a second conveyor supported by said shaft and being mounted for universal movement with relation to said bed, driving connections between said gear and said second conveyor for driving the second conveyor at the same time the first conveyor is driven, and means for removing said members forming a bottom for said bed while said members are supporting material thereon, so that the weight of the load of materials is normally removed from the first conveyor and the materials can be delivered to said first conveyor as desired.

REUBEN E. WALL.